(12) United States Patent
Schulze et al.

(10) Patent No.: US 6,955,098 B2
(45) Date of Patent: Oct. 18, 2005

(54) FORCE SENSOR WITH TWO FORCE INPUT ELEMENTS

(75) Inventors: Werner Schulze, Goettingen (DE); Otto Kuhlmann, Goettingen (DE)

(73) Assignee: Sartorius AG, Goettingen (DE)

( * ) Notice: Subject to any disclaimer, the term of this patent is extended or adjusted under 35 U.S.C. 154(b) by 4 days.

(21) Appl. No.: 10/893,928

(22) Filed: Jul. 20, 2004

(65) Prior Publication Data

US 2005/0072246 A1 Apr. 7, 2005

Related U.S. Application Data

(63) Continuation of application No. PCT/EP03/00331, filed on Jan. 15, 2003.

(30) Foreign Application Priority Data

Jan. 21, 2002 (DE) .......................................... 102 02 400

(51) Int. Cl.⁷ ................................................ G01L 1/10
(52) U.S. Cl. ................................................ 73/862.625
(58) Field of Search ...................... 73/862.621, 862.625, 73/862.636, 862.637

(56) References Cited

U.S. PATENT DOCUMENTS

| | | | |
|---|---|---|---|
| 4,196,784 A | | 4/1980 | Suzuki et al. |
| 4,820,283 A | * | 4/1989 | Schickling et al. ......... 604/534 |
| 4,993,267 A | * | 2/1991 | Allard et al. .................. 73/726 |
| 5,450,933 A | * | 9/1995 | Schuttler ..................... 188/300 |
| 5,756,943 A | | 5/1998 | Naito et al. |
| 6,002,090 A | | 12/1999 | Johnson et al. |

FOREIGN PATENT DOCUMENTS

| | | |
|---|---|---|
| DE | 38 24 636 A1 | 1/1990 |
| FR | 2 386 024 A | 10/1978 |
| GB | 2 101 753 A | 1/1983 |
| WO | WO 96/27780 A1 | 9/1996 |
| WO | WO 02/08705 A1 | 1/2002 |

* cited by examiner

*Primary Examiner*—Max Noori
(74) *Attorney, Agent, or Firm*—Sughrue Mion, PLLC

(57) ABSTRACT

A force sensor with two force input elements to which a force to be measured and a support force are applied. The two force input elements are substantially rotationally symmetrical and are axially spaced apart, and the force to be measured and the support force are applied in radial directions. A spring element, arranged axially between the two force input elements connects these elements and its load-dependent deformation is converted into an electrical signal. A suppression of transverse forces is achieved in a purely mechanical manner so that the influence of transverse forces on the output signal of the force sensor are negligible. Both force input elements are additionally connected to each other by a guide element which encloses the spring element and which has two parallel guide connectors. The guide element is softer in the direction of the force to be measured than in a direction perpendicular thereto.

17 Claims, 2 Drawing Sheets

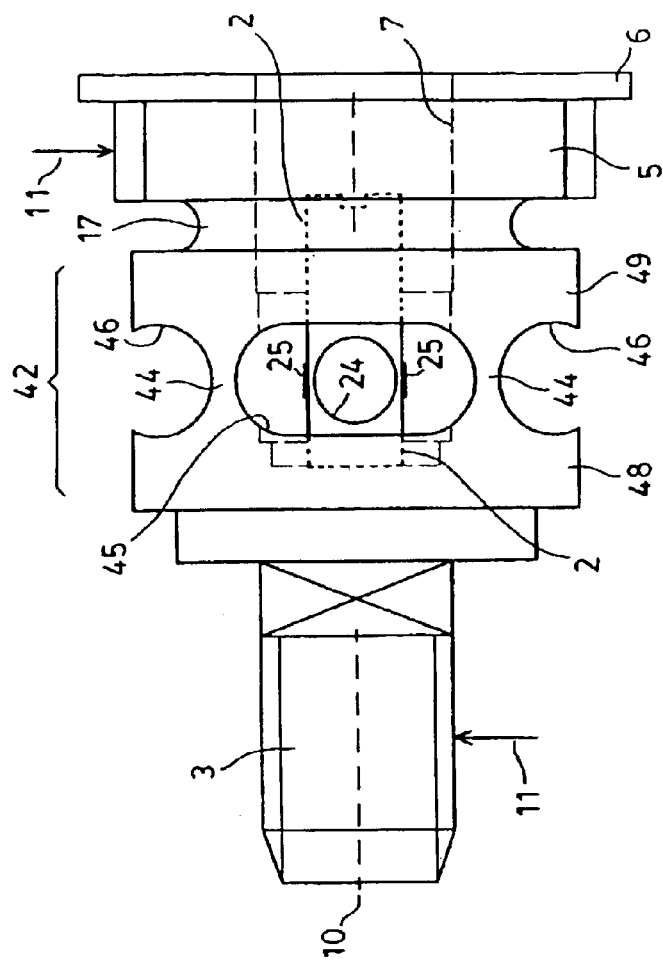
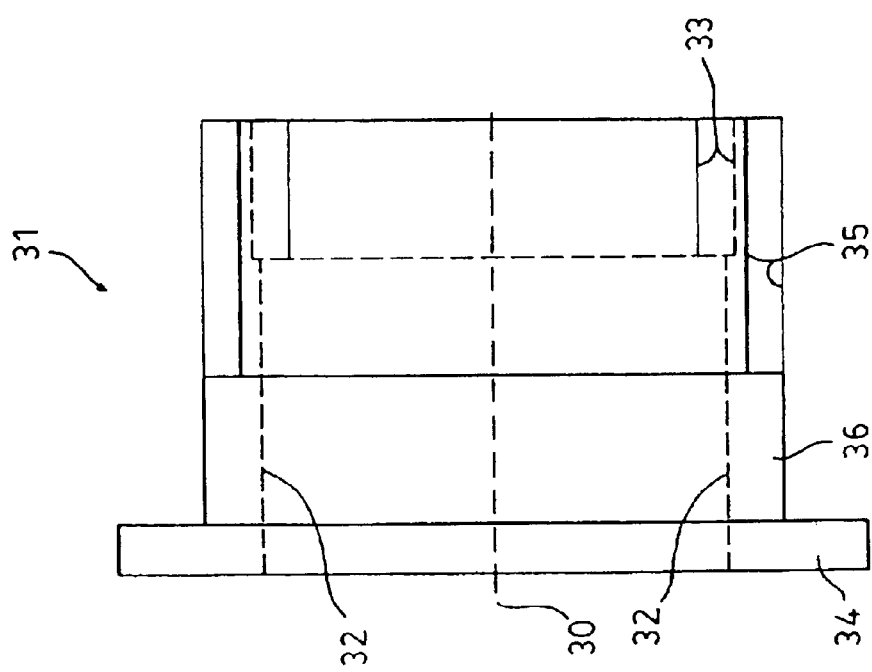
FIG. 5
FIG. 4

FORCE SENSOR WITH TWO FORCE INPUT ELEMENTS

CROSS-REFERENCE TO RELATED APPLICATIONS

This is a Continuation of International Application PCT/EP03/00331, with an international filing date of Jan. 15, 2003, which was published under PCT Article 21(2) in German, and the disclosure of which is incorporated into this application by reference.

FIELD OF THE INVENTION

The invention relates to a force sensor with two force input elements to which the force to be measured and the support force are applied. The two force input elements are substantially rotationally symmetrical and are axially spaced apart. The force to be measured and the support force are applied in radial direction. A spring element, arranged axially between the two force input elements, connects these elements, and its load-dependent deformation is converted into an electric signal.

BACKGROUND OF THE INVENTION

Force sensors are known, for example, from U.S. Pat. No. 6,002,090. With force sensors of this type, it is generally desirable for a force in the measuring direction to yield the largest possible output signal, whereas a force in a direction perpendicular to the measuring direction preferably does not yield any output signal (i.e., no transverse sensitivity). This goal can be substantially achieved by skillful arrangement of strain gauges for measuring the load-dependent deformation that occurs. This is accomplished by adding up the signals of the individual strain gauges in the measuring direction, but subtracting the signals in directions perpendicular to the measuring direction. There then remain only residual signals due to minor asymmetries in the mechanical design and strain gauges. To correct this residual error, according to U.S. Pat. No. 6,002,090, additional strain gauges are arranged on the spring element in addition to the strain gauges that are sensitive in the measuring direction. These additional strain gauges are sensitive in a direction perpendicular to the measuring direction and their signals correct the errors in the signals of the strain gauges in the measuring direction. However, these additional strain gauges and the respective electronic circuit make it much more expensive to manufacture the force sensors.

OBJECTS OF THE INVENTION

An object of the invention is, therefore, to provide a force sensor in which the transverse sensitivity is reduced by purely mechanical means, i.e., without additional measuring elements such as strain gauges and without additional electronic analyzer equipment.

SUMMARY OF THE INVENTION

According to the invention, the foregoing object is accomplished by interconnecting the two force input elements by a guide element which surrounds the spring element. As a parallel guide having of at least two connecting rods, the guide element is softer in the direction of the force to be measured than in the direction perpendicular to it.

The additional guide element between the two force input elements results in a force shunt to the spring element, so that only a fraction of the forces applied act on the spring element. Due to the different hardness of the additional guide element in the different directions, this fraction varies, depending on the force direction. The additional guide element is relatively soft in the measuring direction and the force component passing through the spring element is relatively great. Perpendicular to the measuring direction, however, the additional spring element is hard and therefore absorbs most of the force applied in this direction. Forces perpendicular to the measuring direction therefore reach the spring element in only a greatly diminished form. Therefore, the known measures of geometric configuration of strain gauges on the spring element and the connection to a Wheatstone bridge are sufficient to reduce the output signal of forces perpendicular to the measuring direction almost entirely to zero.

A particularly space-saving embodiment that can be manufactured advantageously is obtained if the guide element is designed substantially in the form of a tube, if the spring element is arranged axially in the interior of the tube and if the parallel guide is produced by at least one transverse bore in the tube wall. The guide element therefore accommodates the substantially rotationally symmetrical design of the remaining force sensor and can be manufactured in an automatic lathe in the same operation. This is true in particular if the force input elements and the guide element are designed in one piece. The transverse bore(s) for creating the parallel guide can be mounted in machining centers without rechucking.

Other advantageous embodiments are derived from the invention described below.

BRIEF DESCRIPTION OF THE DRAWINGS

The invention will now be described in greater detail with reference to the schematic figures, in which:

FIG. 4 shows a sleeve which can be screwed onto the force sensor, and

FIG. 5 shows an alternative embodiment of the force sensor in a side view.

DETAILED DESCRIPTION OF THE PREFERRED EMBODIMENTS

Figures 1, 2, 3:
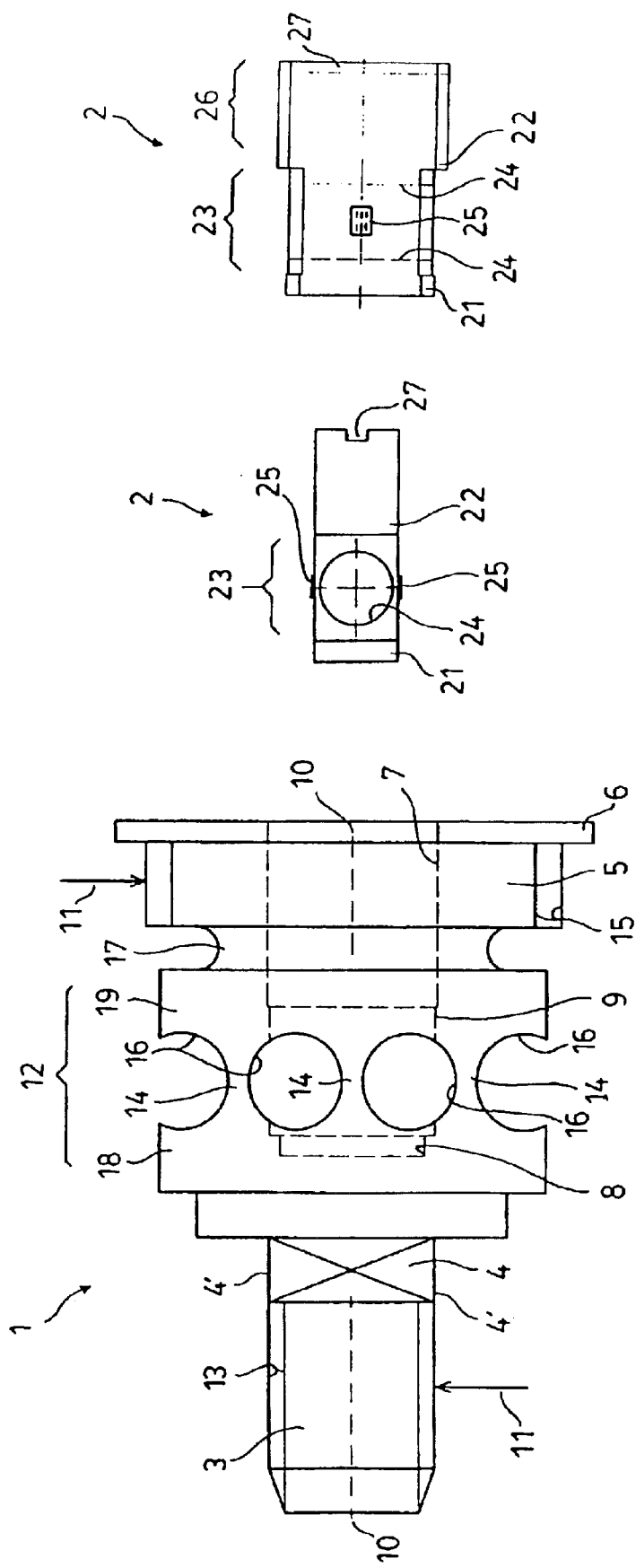
FIG. 1 shows a side view of the force sensor without the spring element.
FIG. 2 shows a side view of the spring element.
FIG. 3 shows a front view of the spring element.

The force sensor 1 is shown in a side view in FIG. 1—without the spring element for the sake of simplicity. The spring element 2 is also shown in side view in FIG. 2. In the mounted state, the front part 21 of the spring element is in a force-locked connection with the end area 8 of the blind hole 7, while the rear part 22 of the spring element is connected to the area 9 of the blind hole.

The force sensor 1 is designed to be substantially rotationally symmetrical with the axis of symmetry 10. The force to be measured and the support force—indicated by the two arrows 11 in FIG. 1—act first on a collar 5 that has a thread 15 and is bordered by a flange 6 and act second on an axle stump 3 having a thread 13. The collar 5 with the flange 6 and axle stump 3 thus form the two force input elements. For accurate alignment and force measurement of the force sensor in installation, the axle stump 3 has a quadrilateral structure 4 in the rear area. The front and rear bordering surfaces of this quadrilateral structure are parallel to the direction of measurement, and the upper and lower bordering surfaces 4' are perpendicular to the direction of the measurement. Instead of the quadrilateral structure, for example, an orientation aid such as an orientation pin may also be provided for aligning the force sensor. Between the two force input elements 5/6 and 3, there is first the spring element 2 and second a guide element 12. The guide element 12 consists of a stable area 18 which is connected to the axle stump 3, a stable area 19 which is connected to the collar 5 via a neck area 17 and three connecting portions or rods 14 that connect the stable areas 18 and 19 in the form of a parallel guide. The three connecting rods 14 are machined out of the guide element 12, which is otherwise tubular at this location, resulting in transverse bores 16. Accordingly, the guide element is relatively soft in the direction of the forces 11, 11' to be measured, whereas it has significantly higher rigidity in the direction perpendicular to the direction of the forces 11, 11'. For example, the rigidity in the direction of the forces 11, 11' to be measured can amount to only 1 MN/mm, while the rigidity in the direction perpendicular to that can amount to 1000 MN/mm.

The spring element 2 shown in the side view in FIG. 2 is situated in the blind hole 7 of the force sensor 1. FIG. 3 shows a frontal view of the spring element 2, i.e., rotated by 90° in comparison with FIG. 2. The spring element 2 is produced by milling a solid cylinder on both sides, for example. The front part 21 of the spring element 2 is welded, glued, shrunk or otherwise secured in a force-locked manner to the end area 8 of the blind hole 7 when the force sensor is assembled. The middle part 23 does not have any contact with the wall because in the corresponding area the blind hole 7 has a larger diameter, as can be seen in FIG. 1. Only the step 22 of the spring element 2 is in contact with the wall in the area 9 of the blind hole 7 and is joined to it by welding, gluing, shrinking or some other method. The rear area 26 of the spring element 2 is again free because in the design of the force sensor according to FIG. 1, the diameter of the blind hole 7 in the corresponding area is even larger. At its end, the spring element 2 has a slot 27 which facilitates alignment of the spring element in relation to the direction of measurement in installation. The spring element 2 also has a continuous transverse bore 24 so that there remains only a relatively thin area of material on each side to which strain gauges are applied in the known way.

Due to the arrangement of the spring element 2 and the surrounding guide element 12 explained above, the two elements are connected in parallel in terms of force. The measurement force and transverse forces are thus divided between two paths, with the ratio of the component forces being based on the ratio of the respective rigidities. If the rigidity of the guide element 12 is 1 MN/mm in the measuring direction, for example, and is 1000 MN/mm in the direction perpendicular to the measuring direction, and the rigidity of the spring element 2 is 10 kN/mm in the measuring direction and is 100 kN/mm in the direction perpendicular to the measuring direction, then barely 1% of the acting force is acting on the spring element 2 in the measuring direction and barely 0.01% is acting in the direction perpendicular to that. Due to this great difference in rigidity of the guide element 12 in the two directions, transverse forces are thus transmitted to the spring element 12 with its strain gauge to a lesser degree by a factor of 100 than the forces to be measured. Together with the known methods of geometric arrangement of strain gauges 25 on the spring element 2 and the connection to form a Wheatstone bridge, this makes it possible to achieve such a great suppression of the influence of transverse forces on the output signal that the influence is lost in the general measurement precision.

In FIG. 1, the two force input elements 3 and 5/6 and the guide element 12 are designed as one piece. This design ensures a low hysteresis. With dimensioning according to the stated numerical example, easily 99% of the measurement force is directed through the guide element 12, so a low hysteresis of the guide element also yields a low hysteresis of the entire force sensor.

FIG. 4 shows a side view of a sleeve 31 that can be screwed onto the force sensor 1. The sleeve 31 is designed with rotational symmetry and has an axis of symmetry 30. The sleeve has an inside thread 33 in its core bore 32, which can be screwed onto the outside thread 15 of the force sensor 1. On the outside, the sleeve 31 has a blind flange 34 and an outside thread 35—the collar 5 with the flange 6 as a force input element can be enlarged by this sleeve. The force can then be applied to the outside thread 35 or to the thread-free area 36 or to the flange 34, depending on the requirement of the given force sensor installation case. For example, the force sensor with the sleeve 31 may be installed in a hole provided with sheet metal, with the sheet metal being clamped between the blind flange 34 and a nut on the outside thread 35. Having the force input near the blind flange 34 reduces the lateral distance between the force and the support force (forces 11 and 11' in FIG. 1), thereby reducing the torque to be accommodated. In addition, the sleeve 31 acts as protection against environmental influences (e.g., dust) and also as a radial overload protection.

FIG. 5 shows an alternative embodiment of the force sensor in a side view. The same parts as in FIG. 1 and FIG. 2 are labeled with the same reference numbers and will not be explained again. The differences consist only in the form of the guide element: the guide element 42 has two connecting portions or rods 44 that connect the stable areas 48 and 49. The connecting rods 44 are created by two bores 46 and a elongated hole 45. Due to the elimination of the third connecting rod in the guide element, its rigidity in the direction of the forces 11, 11' to be measured amounts to only two-thirds of the rigidity of the embodiment according to FIG. 1. Perpendicular to the direction of the forces to be measured, the rigidity also drops by approximately the same factor, so the suppression of transverse forces is approximately the same for the two variants.

FIG. 5 also shows that in the finished force sensor, the thin places in the connecting rods 44 and the thin places in the spring element 2 beneath the strain gauges 25 are in the same plane. This is also true of the force sensor according to FIG. 1 and FIG. 2.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A force sensor, comprising:
   a first force input element for receiving a force to be measured that is applied in a first radial direction of the force sensor;
   a second force input element for receiving a support force that is applied in a second radial direction of the force sensor;
   wherein the first force input element is substantially rotationally symmetrical to and axially spaced apart from the second force input element;
   the force sensor further comprising:

a spring element, which is located axially between and which connects the first force input element and the second force input element, the spring element has a load-dependent deformation that is converted into an electrical signal by the force sensor; and a guide element, which surrounds the spring element and additionally joins the first force input element to the second force input element, the guide element comprising at least two connecting rods that provide a parallel guide that is significantly softer in the first radial direction than in a direction perpendicular to the first radial direction.

2. The force sensor as claimed in claim 1, wherein the guide element is substantially tubular; the spring element is arranged axially in an interior of the guide element and the parallel guide is formed by at least one transverse bore in a wall of the guide element.

3. The force sensor as claimed in claim 1, wherein the guide element together with the two force input elements are a one-piece integral construction.

4. The force sensor as claimed in claim 1, wherein the guide element comprises three connecting rods.

5. The force sensor as claimed in claim 1, wherein the second force input element has a quadrilateral structure for accurate alignment of the force sensor in relation to the direction of the force to be measured.

6. The force sensor as claimed in claim 1, wherein the second force input element has an orientation pin for accurate alignment of the force sensor in relation to the direction of the force to be measured.

7. The force sensor as claimed in claim 1, wherein the spring element is welded between the first force input element and the second force input element.

8. The force sensor as claimed in claim 1, wherein the spring element is shrunk between the first force input element and the second force input element.

9. The force sensor as claimed in claim 1, wherein the spring element is glued between the first force input element and the second force input element.

10. The force sensor as claimed in claim 1, wherein the spring element is a plate spring and comprises a central transverse bore and strain gauges arranged on the thin places created by the transverse bore.

11. The force sensor as claimed in claim 1, further comprising a sleeve screwed onto the first force input element and surrounding the guide element, the sleeve receiving the force to be measured and transmitting the force to be measured to the first force input element.

12. A force sensor, comprising:
   a member having an axis, comprising:
      a first force input element receiving a first force applied to the force sensor;
      a second force input element receiving a second force applied to the force sensor in a direction opposing the first force, the second force input element axially spaced from the first force input element;
      a guide element disposed between the first force input element and the second force input element, the guide element having an interior space; and
   a spring element disposed inside the interior space of the guide element, wherein deformation of the spring element is converted into a corresponding electrical signal; and
   wherein the guide element comprising at least two connecting rods that provide a parallel guide that is significantly softer in a first radial direction than in a direction perpendicular to the first radial direction so as to mechanically suppress the influence on the electrical signal of forces acting in a direction transverse to the direction of the first and second forces.

13. The force sensor as claimed in claim 12, wherein the guide element is substantially tubular; the spring element is arranged axially in the interior of the guide element and the parallel guide is formed by at least one transverse bore in a wall of the guide element.

14. The force sensor as claimed in claim 12, wherein the guide element together with the two force input elements are a one-piece integral construction.

15. The force sensor as claimed in claim 12, wherein the guide element comprises three connecting rods.

16. The force sensor as claimed in claim 12, further comprising a sleeve screwed onto the first force input element and surrounding the guide element, the sleeve receiving the force to be measured and transmitting the force to be measured to the first force input element.

17. The force sensor as claimed in claim 12, wherein the member is substantially cylindrical about the axis.

* * * * *